(12) United States Patent
Jameson

(10) Patent No.: US 7,966,346 B1
(45) Date of Patent: Jun. 21, 2011

(54) UPDATING GROUPS OF ITEMS

(75) Inventor: Kevin W. Jameson, Calgary (CA)

(73) Assignee: Coverity, Inc., San Francisco, CA (US)

( * ) Notice: Subject to any disclaimer, the term of this patent is extended or adjusted under 35 U.S.C. 154(b) by 25 days.

(21) Appl. No.: 11/339,178

(22) Filed: Jan. 23, 2006

(51) Int. Cl.
*G06F 17/30* (2006.01)
*G06F 7/00* (2006.01)

(52) U.S. Cl. ........ 707/796; 707/625; 707/690; 707/708; 717/122; 717/169; 717/170

(58) Field of Classification Search .................. None
See application file for complete search history.

(56) References Cited

U.S. PATENT DOCUMENTS

| | | | | |
|---|---|---|---|---|
| 5,170,465 A | * | 12/1992 | McKeeman et al. | 717/145 |
| 5,182,806 A | * | 1/1993 | McKeeman et al. | 717/145 |
| 5,325,531 A | * | 6/1994 | McKeeman et al. | 717/145 |
| 5,651,111 A | * | 7/1997 | McKeeman et al. | 714/38 |
| 5,689,711 A | * | 11/1997 | Bardasz et al. | 717/105 |
| 5,937,155 A | * | 8/1999 | Kennedy et al. | 714/38 |
| 5,996,073 A | * | 11/1999 | Lee et al. | 713/1 |
| 6,178,546 B1 | * | 1/2001 | McIntyre | 717/115 |
| 6,253,213 B1 | * | 6/2001 | Vanderschaaf | 707/203 |
| 6,519,599 B1 | * | 2/2003 | Chickering et al. | 707/10 |
| 7,139,999 B2 | * | 11/2006 | Bowman-Amuah | 717/101 |
| 2005/0034111 A1 | * | 2/2005 | Martin et al. | 717/141 |
| 2005/0256818 A1 | * | 11/2005 | Sun et al. | 706/46 |
| 2006/0130030 A1 | * | 6/2006 | Kwiat et al. | 717/159 |
| 2006/0206865 A1 | * | 9/2006 | Reinhardt et al. | 717/108 |
| 2007/0033201 A1 | * | 2/2007 | Stienhans | 707/100 |

* cited by examiner

*Primary Examiner* — Greta L Robinson
*Assistant Examiner* — James J Wilcox
(74) *Attorney, Agent, or Firm* — Schwegman, Lundberg & Woessner, P.A.

(57) ABSTRACT

Updating a set of items is disclosed. A set of items is received. The set of items is partitioned into groups. Group dependency information for the groups is calculated. Optionally, a dependency report is produced. Optionally, groups are updated. Optionally, change impact analysis is performed.

23 Claims, 8 Drawing Sheets

FIG. 6

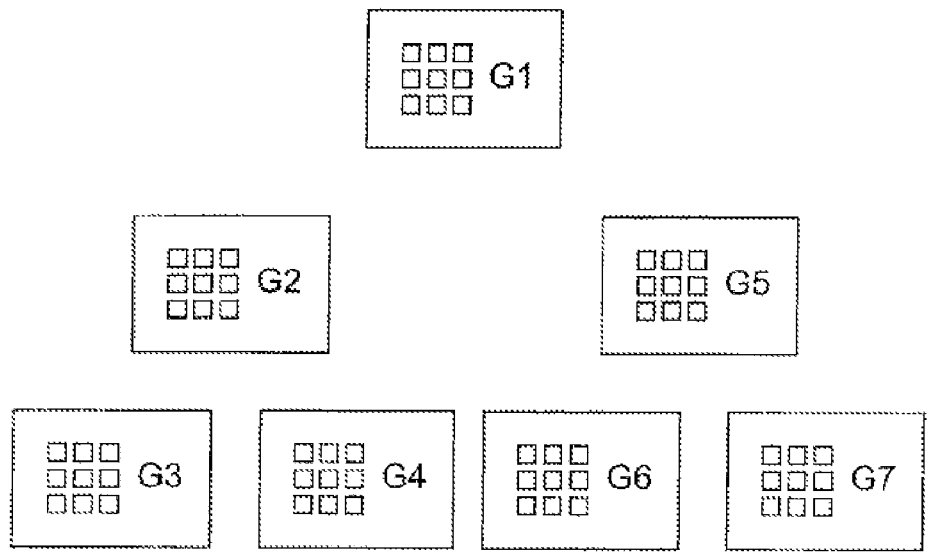

FIG. 7

```
1   group G1 consumes program progG2.exe from group G2
2   group G1 consumes program progG5.exe from group G5
3   group G1 produces file release7.zip 4   group G2 consumes include libG3.h from group G3
5   group G2 consumes library libG3.lib from group G3
6   group G2 consumes include libG4.h from group G4
7   group G2 consumes library libG4.lib from group G4
8   group G2 produces program progG2.exe 9   group G3 produces file libG3.h
10  group G3 produces file libG4.lib
```

FIG. 8

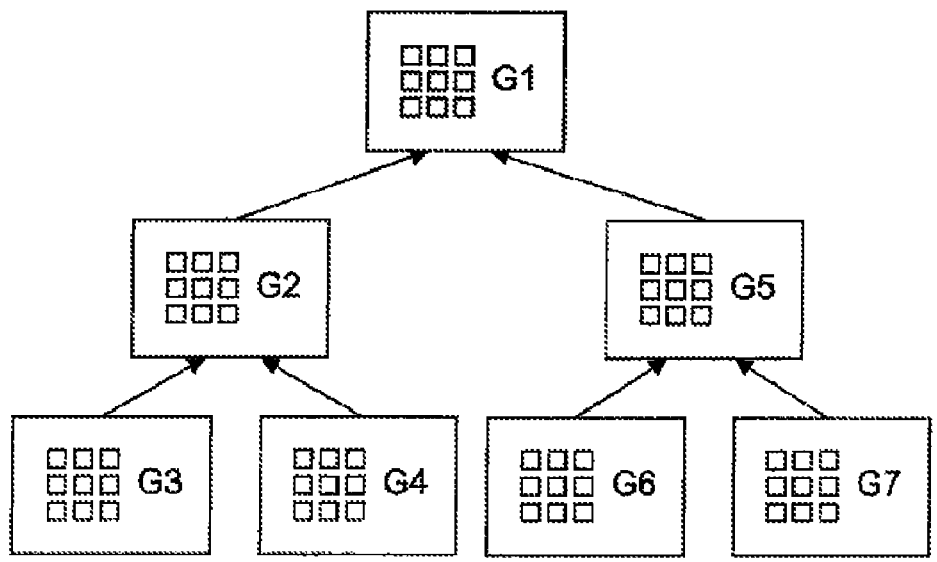

FIG. 9

```
1    group G1 consumes program progG2.exe
2    group G1 consumes program progG5.exe
3    group G1 produces zipfile release7.zip
4    group G2 consumes include libG3.h
5    group G2 consumes library libG3.lib
6    group G2 consumes include libG4.h
7    group G2 consumes library libG4.lib
8    group G2 produces program progG2.exe
9    group G3 produces libG3.h
10   group G3 produces libG4.lib
11   ...
12   group G7 consumes ...
13   group G7 produces ...
```

UPDATING GROUPS OF ITEMS

BACKGROUND OF THE INVENTION

Keeping large numbers of interdependent items consistent with each other can be a costly process. One reason is that when items change, every item in a potentially enormous set must be inspected to see if it has dependencies on any changed items. For example, if a first inspected item depends on a second changed item, then the first inspected item must be updated to make the members of the entire set of items consistent with each other once again. In addition, all items in the set that are affected by the first changed and the updated item must also be inspected to see if they depend on the updated item. The cost of updating all affected items in the set can be very high—a single small change in one item out of tens of thousands of items can trigger many hours of computer activity, including routinely checking members of the set that are not even affected by the change. Therefore it would be desirable to have a more efficient way of achieving consistency among sets of items.

BRIEF DESCRIPTION OF THE DRAWINGS

Various embodiments of the invention are disclosed in the following detailed description and the accompanying drawings.

FIG. 6 is a diagram that illustrates an embodiment of a set of items that has been partitioned into groups.

FIG. 7 is a diagram that illustrates an embodiment of dependency signatures.

FIG. 8 is a diagram that illustrates an embodiment of a dependency graph.

FIG. 9 is a diagram that illustrates an embodiment of a dependency report.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
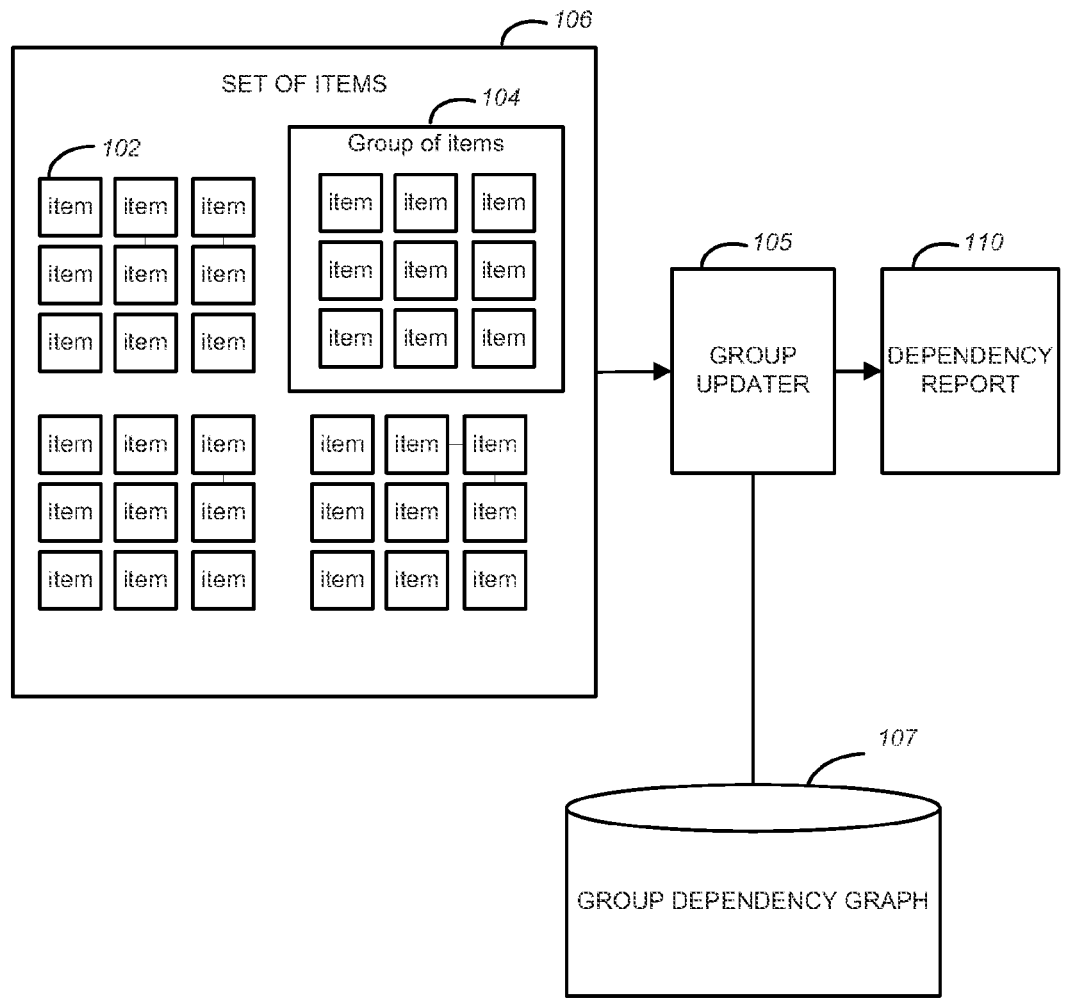
FIG. 1 is a diagram that illustrates an embodiment of a system for up-dating a set of items.

FIG. 1 is a diagram that illustrates an embodiment of a system for up-dating a set of items. One or more items 102 is included in a set, such as set of items 106 (hereinafter "set 106"). Set 106 is analyzed by a group updater 105, which groups items 102 into one or more groups 104. As explained in greater detail below, in some embodiments, group updater 105 creates a group dependency graph 107 and a group dependency report 110, both/either of which can be used to update the set 106 with respect to changed items in the set.

In the example shown, items include computer files containing source code for computer programs. Items can also include link library files, include files, program executable files, web page files, document files, configuration files, graphics files, and other types of files as applicable.

As discussed in more detail below, the dependency report 110 may be a full report that describes all dependency relationships among all groups of items in set 106. In other cases, the dependency report is more limited, such as by including only those items, or groups of items that have dependency relationships with a specified changed item within set 106.

Figure 2:
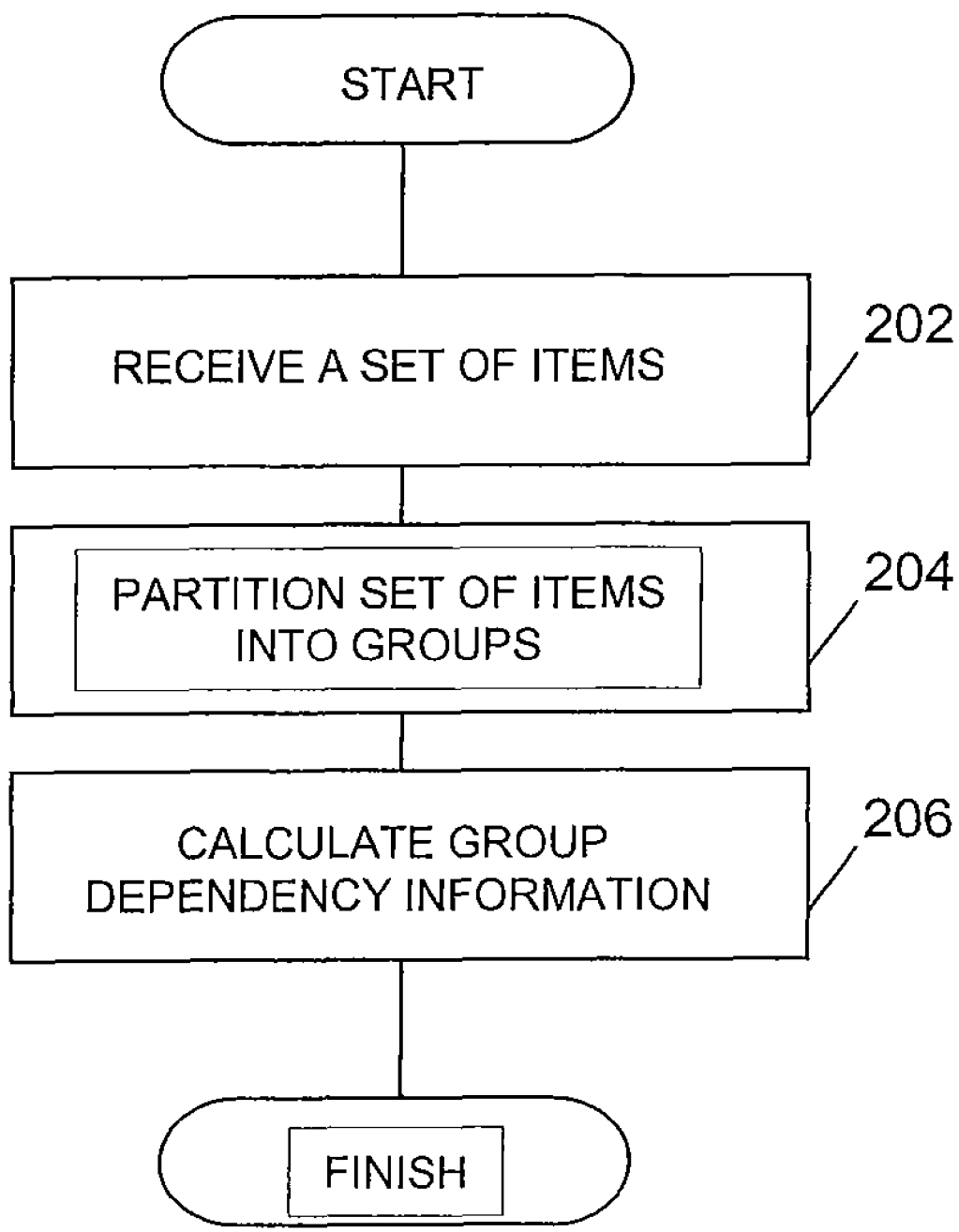
FIG. 2 is a flow chart that illustrates an embodiment of a process for updating a set of items.

FIG. 2 is a flow chart that illustrates an embodiment of a process for updating a set of items. The process begins at 202, when a set of items, such as set 106, is received. In some embodiments, set identity information is received at 202, instead of or in addition to receiving a list of specific set members. As described in more detail below, set identity information includes at least one criterion for determining the members of a set, such as set 106.

As described in more detail below, at 204, set 106 is partitioned into one or more groups 104 of items 102. At 206, group dependency information is calculated for each group of items in the set. In this example, group dependency information for an individual group is recalculated every time the group is changed by adding or removing group members, or by changing the contents of a member of the group. One way of calculating group dependency information for the entire set of groups after one or more groups has been changed is to examine the changed groups, the dependency signatures of the changed groups, and groups that are affected by changed dependency signatures (if any).

Figure 3:
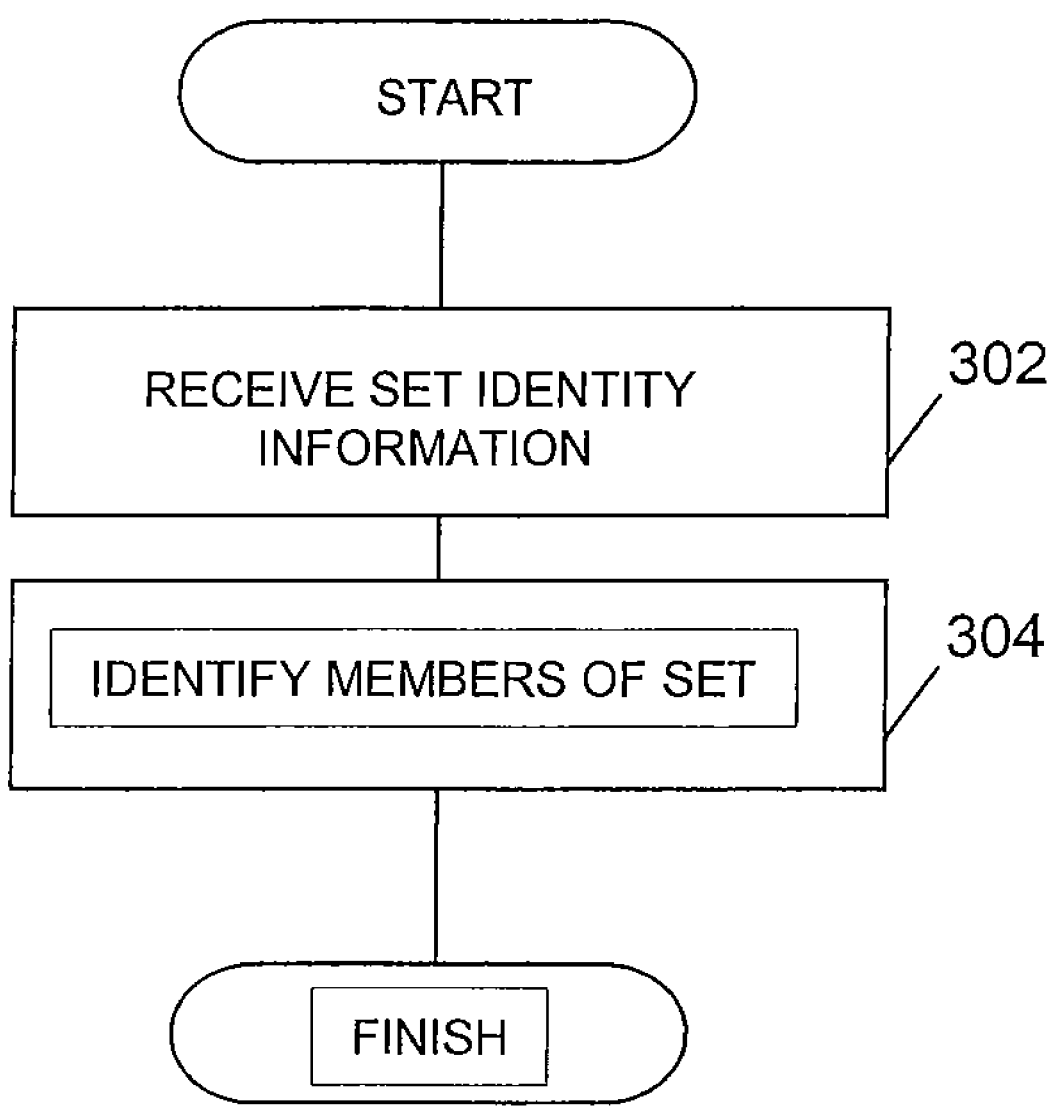
FIG. 3 is a flow chart that illustrates an embodiment of a process for receiving and identifying a set of items.

FIG. 3 is a flow chart that illustrates an embodiment of a process for receiving and identifying a set of items. The process could be an example of an implementation of portion 202 of FIG. 2.

In the example shown, at 302, set identity information is received. At 304, the set identity information is used to determine individual members of set 106. For example, a filesystem pathname such as "/usr/home/mysetoffiles" or "My Documents" may be received at 302. In this example, all files in the filesystem below the specified pathname would be identified as members of set 106. A file containing the explicit names of members of the set could also be received, or with other indirect information could be received that could be used to identify the members of a set. For example, indirect information could include information such as names that could be used to retrieve set membership information from a project file belonging to an integrated development environment (IDE), by a list of names provided to group updater 105 at runtime, from a configuration management system, from a database, or from some any other applicable source.

In some embodiments, group updater 105 is configured to search a filesystem for potential member files of the set (e.g., all files larger than 1 KB), and/or might query a database or network service to obtain information for identifying members of a set. Other methods of constructing a list of items with or without the help of provided metadata may also be used, as appropriate.

Figure 4:
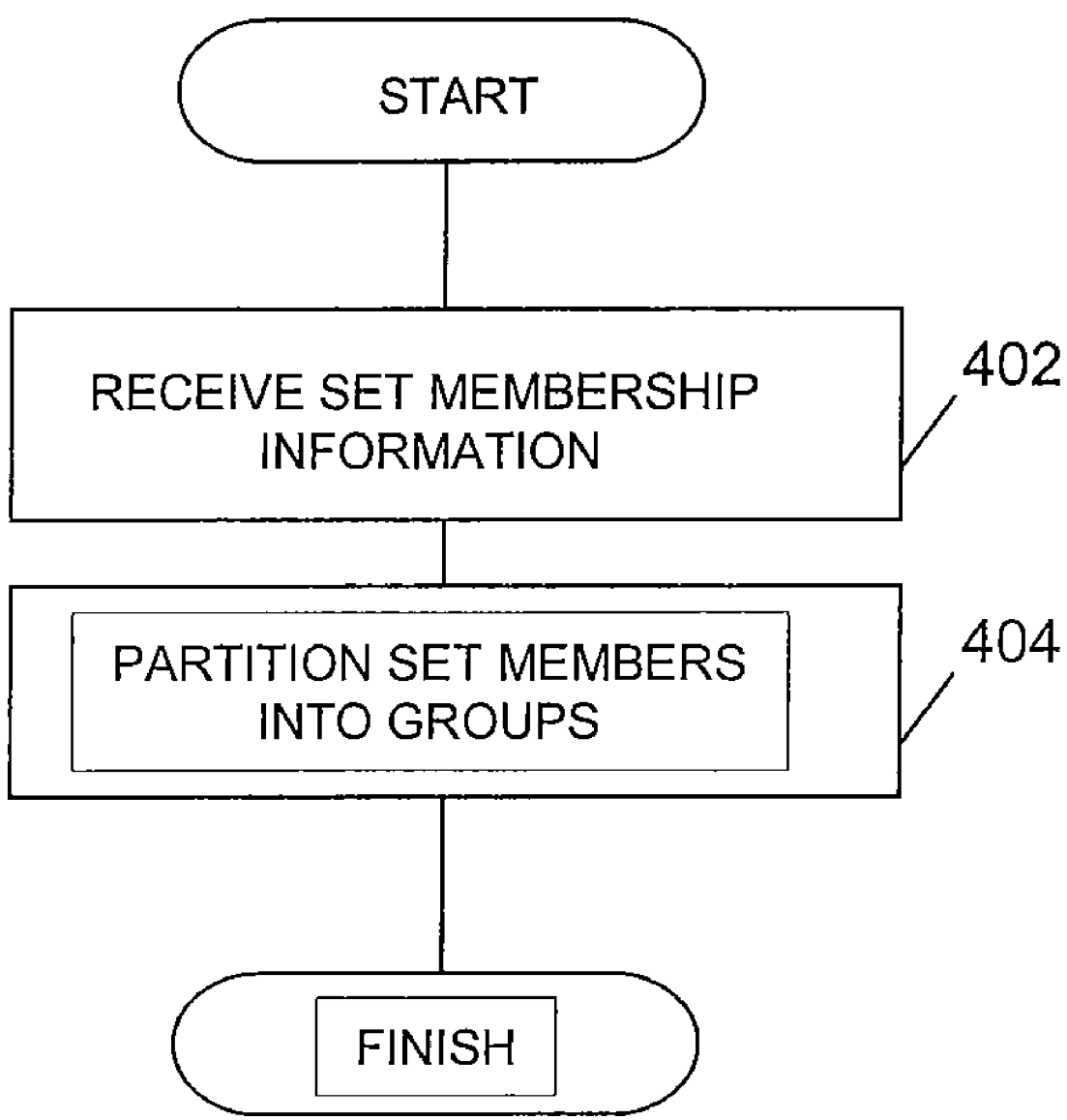
FIG. 4 is a flow chart that illustrates an embodiment of a process for partitioning items into groups.

FIG. 4 is a flow chart that illustrates an embodiment of a process for partitioning items into groups. The process could be an example of an implementation of portion 204 of FIG. 2. The process begins at 402, when membership information for a set is received. In this example, membership information includes a list of items, such as item 102, that are included in set 106. In some cases, membership information is identical to identity information, such as is used at 202 in FIG. 2. In some cases, membership information is the result of using set identity information to determine the members of a set, such as may be done through the process depicted in FIG. 3.

At 404, members of the set are partitioned into groups. In the example shown, items are grouped into groups such as group 104 based on one or more criteria. For example, items could be grouped according to one or more of: their attributes (read-only, archived), size, age, number of dependency relationships that they participate in (e.g., reliance on the same library), internal contents, file type, or by any other criterion or criteria as appropriate. In some cases, group membership is based on physical location in the filesystem (e.g., all files in MyDocuments/Project1 and associated subfolders) or on filenames listed in the project file for an IDE. Conventions that dynamically calculate group membership can also be used. For example, a marker file or pathname might be used to identify locations in a computer system, and by convention, all files located in the subtree rooted at the marker location could be members of a group associated with the marker file, pathname, or other marker device.

Figure 5:
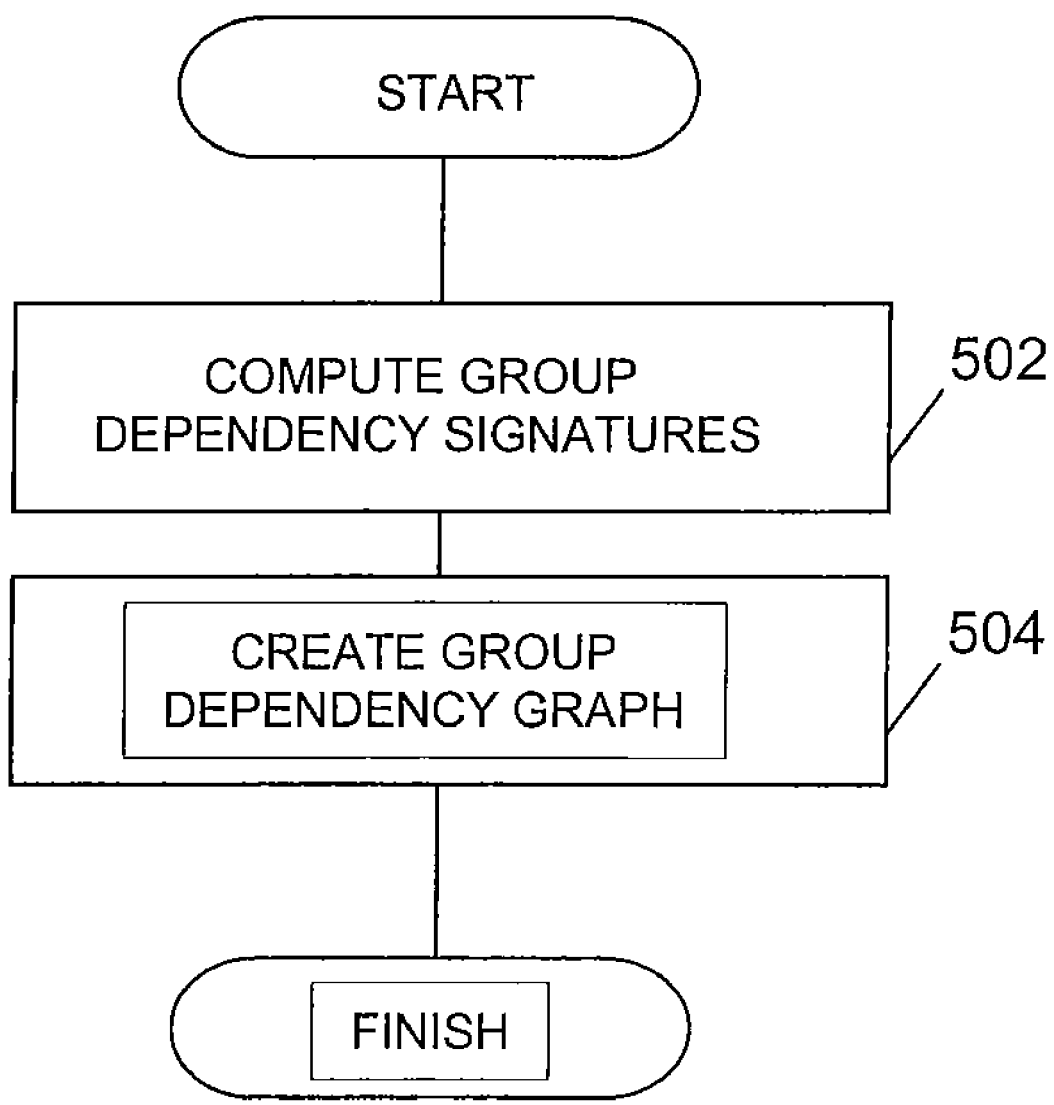
FIG. 5 is a flow chart that illustrates an embodiment of a process for calculating dependency information for a group of items.

FIG. 5 is a flow chart that illustrates an embodiment of a process for calculating dependency information for a group of items. The process could be an example of an implementation of portion 206 of FIG. 2. The process begins at 502, when a dependency signature is calculated for each group 104.

A dependency signature describes the dependency interface of a group of items—what the group depends on, and what the group produces that other groups might depend on. A dependency graph is a data structure that relates dependency relationships among groups within a set.

Dependency relationships are relationships between the state of one item or group of items and the state of another item or group of items. For example, consider a Group A that contains source files, and a Group B that contains a program executable that is constructed from object files produced by compiling at least some of the source files in Group A. Group B is dependent on the compiled object files from Group A, and a dependency relationship exists between the two groups. Each time source files are modified in Group A, new object files are produced by Group A. The executable program in dependent Group B must be updated to be consistent with the new state of Group A (which contains modified source files and newly compiled object files).

Group dependency signatures can be constructed by identifying and then aggregating individual group-member dependency relationships that cross the group boundary. In some embodiments, "internal" dependency relationships among individual items within a group are ignored because they do not affect the "external" group dependency signature.

In the example shown at 502, dependency signatures are computed from "#include" or "import" statements in computer program source code files. In other cases, other methods are used to computer dependency signatures, such as by using programming language statements that call other subroutines or programs, comments that contain special information such as copyright lines or names or dates, or from any other criteria related to individual members of the group, as appropriate.

At 504, a dependency graph is created. A dependency graph is a data structure that represents dependency relationships among nodes in a graph. A variety of methods, such as are typically used to create and traverse graph data structures can be used to determine predecessors and successors of nodes in a graph, and to determine relationships among predecessors and successors of any node in such a graph. Typically, nodes in the graph represent groups such as group 104, and edges among nodes represent dependency relationships among groups. When one group is changed, the edges from that changed node to other nodes indicate which other groups are affected by the change.

FIG. 6 is a diagram that illustrates an embodiment of a set of items that has been partitioned into groups. In the example shown, items are partitioned into groups of equal size. Typically, when computer program source code files are the items 102 in groups 104 and a set 106, items are not partitioned into groups of equal size. Instead, such files will more likely be grouped according to factors such as their physical location in a filesystem. In some cases, group sizes may be managed, such as by minimizing the number of dependency relationships that the group participates in, or by other criteria as applicable.

FIG. 7 is a diagram that illustrates an embodiment of dependency signatures. In this case, the dependency signatures are for the groups of items shown in FIG. 6. The signatures shown here could have been produced at 502 in the process depicted in FIG. 5. In this example, items produced by a group are recorded in signatures as "produced" items that can be consumed by other groups. Items or information consumed (or required) by a group for consistency are recorded in signatures as "consumed" items. The "produced" items of a group may be consumed by multiple other groups. In such a case, the multiple "consumed" dependency relationships among the groups could be represented in a dependency graph with edges among the affected groups.

Consumed items may be produced by other groups within a set, or by external data sources. An external data source can include any source from which data can be retrieved. Some typical examples of data sources include computer files, disks, servers, memories, network interfaces, and APIs (application programming interfaces).

Here, group consumer dependencies are calculated by analyzing the contents of individual items within the group. In other cases, consumer dependency information can be obtained from metadata about the group that is provided by other data sources.

In some cases, group producer dependencies may not be calculated by analyzing the contents of individual group member items. For example, files that are produced by a group may be created by dynamic computational processes that involve multiple group item members. All items within a group might be compiled and linked into one or more executable files that are produced by the group, but the number and identity and characteristics of the produced executable files cannot always be determined by analyzing the source code files that were compiled to create the executable file.

Lines 1-3 illustrate an example group dependency signature for FIG. 6 group G1, which depends on groups G2 and G5 because G1 consumes files from group G2 (Line 1) and G5 (Line 2). Lines 4-8 illustrate an embodiment of a dependency signature for group G2, which depends on groups G3 and G4 because G2 consumes files from G3 and G4. Lines 9-10 illustrate an embodiment of a group dependency signature for group G3, which does not depend on any other group be-cause G3 does not consume any files produced by any other group.

In the example shown, group producer dependencies are read from text files that contain metadata about the dynamic computational processes that use group members to produce files that are consumed by other groups. Producer dependency information can also be obtained from software build settings in a project file for an integrated development environment, from a database that stores producer information, from a network service that provides such information, or from any other suitable data source as applicable.

In some cases, dependency signatures may include variations. For example, platform-dependent or context-specific signatures can be signatures appropriate for special situations. The term "platform" is used here and throughout to indicate a combination of software and hardware, where the software typically includes an operating system. A dependency signature for a group of files on one operating system could be different than a dependency signature for the same group of files on a second operating system. This may be the case, for example, where the second operating system requires or imposes the use of different items or different internal (inside the group) or external (outside the group) dependencies.

FIG. 8 is a diagram that illustrates an embodiment of a dependency graph. The example shown is one possible calculation from group dependency signatures for the groups shown in FIG. 6.

Dependency graphs are data structures that represent relationships among nodes in a graph. A number of well-known algorithms can be used to traverse graph data structures to determine predecessors and successors of nodes in a graph, and to determine relationships among predecessors and successors of any node in such a graph.

In the example shown, arrows indicate dependency relationships among groups. The head of an arrow points at the dependent item in the relationship. Using the dependency signatures shown in FIG. 7, group G3 in FIG. 8 has no arrowheads pointing at it, so it is not dependent on any other group. But, group G2 has two arrowheads pointing to it, so G2 is dependent on both groups G3 (FIG. 7 Lines 4-5) and G4 (FIG. 7 Lines 6-7). Similarly, group G1 in FIG. 8 is dependent on groups G2 (FIG. 7 Line 1) and G5 (FIG. 7 Line 2).

Dependency graph 107 is optionally stored in a typical database. In other cases, graph 107 is not stored at all, or it could be stored using other data structures, such as in text files, binary files, in various kinds of computer memories including RAM, ROM, flash memory, hard disks, network storage, or with any other computer storage as applicable.

FIG. 9 is a diagram that illustrates an embodiment of a dependency report. In the example shown, dependency report 110 has been calculated for the dependency graph depicted in FIG. 8 and contains a description of dependency relationships in the graph. In other cases, the dependency report may be augmented with lists of item members of each group, with details of the source of each dependency relationship in the group dependency signature, or with any other information, such as information that was gathered or calculated up to the time of report production. The dependency report can also be limited to particular aspects that are relevant to a subset of one or more groups. For example, the report may be limited to just a list of a group's predecessors or successors, and to the dependency relationships among those groups.

In some embodiments, dependency graph 107 and/or dependency report 110 are used in conjunction with change impact analysis. This can, for example, allow software developers who are contemplating a possible source code change to one or more of their software files to see the potential ramifications, for example, before making changes permanent.

Figure 10:
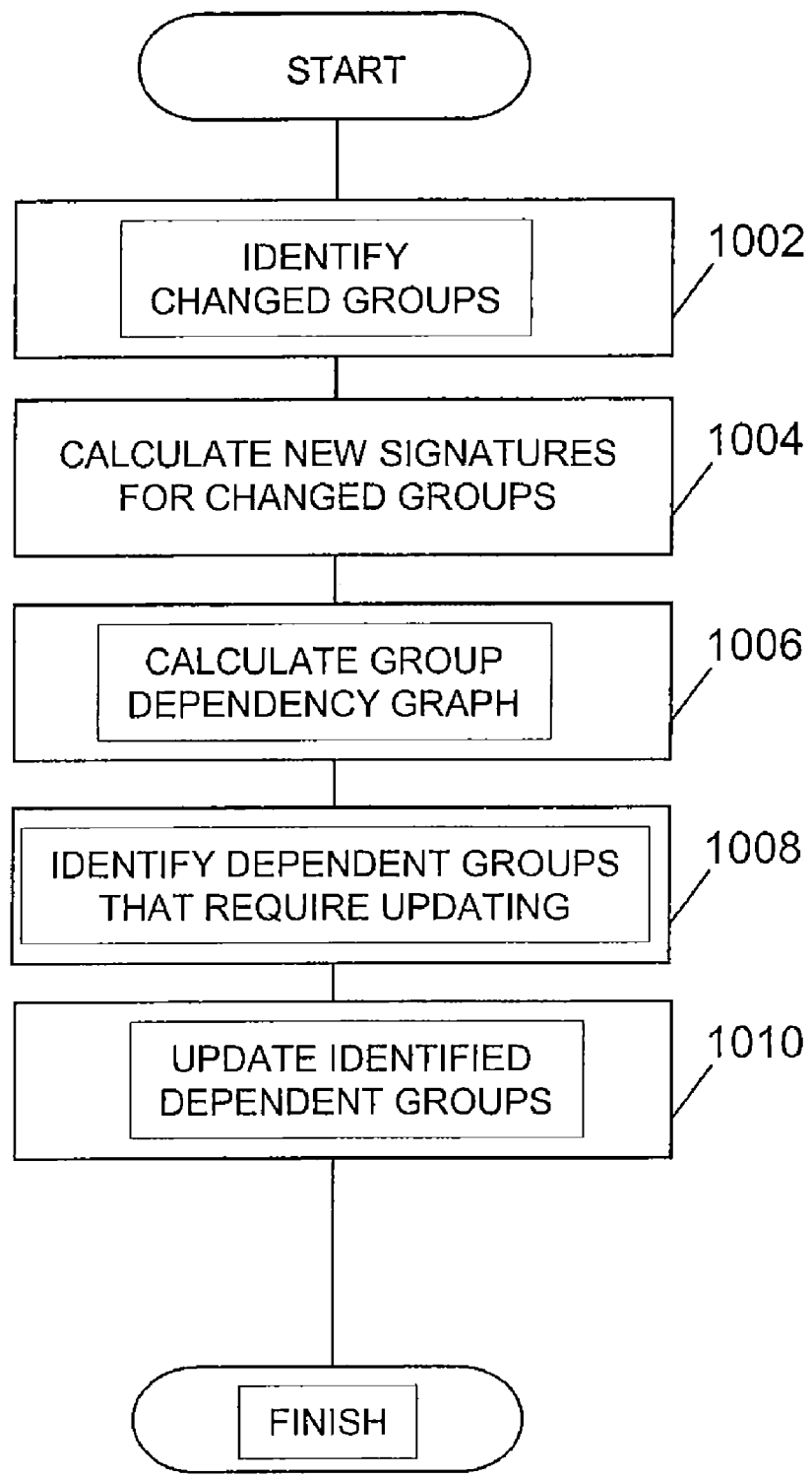
FIG. 10 is a flow chart that illustrates an embodiment of a process for updating a set of items using a group dependency graph.

FIG. 10 is a flow chart that illustrates an embodiment of a process for updating a set of items using a group dependency graph. The process could be an example of an implementation of an application of the architecture shown in FIG. 1. In this example, group updater 105 uses a dependency graph 107 to update groups of items when one or more items in set 106 have been changed. The process begins at 1002, when group updater 105 identifies changed groups in set 106. At 1004, group updater 105 calculates a new dependency signature for each group (such as group 104) that contains changed items. At 1006, group updater 105 calculates a dependency graph using the new dependency signatures, and then at 1008 determines all groups that require updating by traversing the dependency graph to identify all groups that are affected by the changed groups. At 1010, once the identities of groups requiring updating have been determined, their identities could be displayed on a computer screen, be printed on a report, be written to a computer memory, or could be passed to other software that could update the groups, as required.

Because only changed and affected groups in the set must be processed for both calculating group dependency signatures and for updating the groups themselves, the updating process is incremental in nature, and can be more efficient than processing all groups in a set.

Typically, dependency graphs are calculated contemporaneously with the first need for a group updating action. In some cases, a dependency graph may be calculated and stored, and then read and used at a later time.

By using a group dependency graph, the cost of examining every individual item in the set to achieve consistency in the set can typically be avoided when particular items in the set are changed. For example, a list of items that require updating can be calculated by identifying a changed group that contains a changed item, by using a group dependency graph to determine all the dependent groups that depend directly or indirectly on the changed group that contains the changed item, and by inspecting only the items in dependent groups to see if they need updating in order to achieve consistency within the set of items.

Accordingly, for cases where the number of dependent groups on a changed group is smaller than the total number of groups in a set, the computational cost of updating the set is proportionately smaller than the cost of inspecting all items in the set.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A computer-implemented method for updating a set of items, comprising:
   using one or more processors to perform operations of:
   receiving a set of items associated with a computer program development project;
   partitioning the set of items into one or more groups of items;
   identifying a change associated with a first group, the first group being from the one or more groups of items, the first group comprising a first code file;
   determining a first dependency signature for the first group, the dependency signature reflecting dependency relationship of the first group with one or more groups from the one or more groups, wherein the determining of the first dependency signature comprises:
      identifying dependency relationships of items that are members of the first group,
      determining those relationships from the identified dependency relationships that cross group boundary of the first group, and
      including the determined relationships that cross group boundary of the first group into the first dependency signature;
   determining one or more affected groups from the one or more groups, based on the first dependency signature, the affected one or more groups being affected by the change associated with the first group, an item from the one or more affected groups being a second code file; and
   inspecting one or more items only within the one or more affected groups to determine whether such items require updating to achieve consistency with the identified change.

2. The method of claim 1, further comprising calculating a group dependency graph, the group dependency graph reflecting dependency relationships among groups in the one or more group of items.

3. The method of claim 1, further comprising producing a dependency report.

4. The method of claim 1, further comprising storing the first dependency signature.

5. The method of claim 2, further comprising storing the dependency graph.

6. A system for updating a set of items, comprising:
   a processor configured to:
   receive a set of items associated with a computer program development project;
   partition the set of items into one or more groups of items;
   determine a first dependency signature for the first group, the dependency signature reflecting dependency relationship of the first group with one or more groups from the one or more groups, the first group comprising a first code file;
   determine one or more affected groups from the one or more groups, based on the first dependency signature, the one or more affected groups being affected by the change associated with the first group, an item from the one or more affected groups being a second code file, wherein the first dependency signature is determined by:
      identifying dependency relationships of items that are members of the first group,
      determining those relationships from the identified dependency relationships that cross group boundary of the first group, and
      including the determined relationships that cross group boundary of the first group into the first dependency signature; and
      inspect one or more items only within the one or more affected groups to determine whether such items require updating to achieve consistency with the identified change,
   and
   a memory coupled with the processor, wherein the memory is configured to provide the processor with instructions.

7. The system of claim 6, wherein the processor is further configured to calculate a group dependency graph, the group dependency graph reflecting dependency relationships among groups in the one or more group of items.

8. The system of claim 6, wherein the processor is further configured to produce a dependency report.

9. The system of claim 6, wherein the processor is further configured to update groups affected by changed dependency information.

10. The system of claim 6, wherein the processor is further configured to store the first dependency signature.

11. The system of claim 7, wherein the processor is further configured to store the group dependency graph.

12. A computer program product for updating a set of items, the computer program product being embodied in a computer readable storage medium and comprising computer instructions for:
   receiving a set of items associated with a computer program development project;
   partitioning the set of items into one or more groups of items;
   identifying a change associated with a first group, the first group being from the one or more groups of items;
   determining a first dependency signature for the first group, the dependency signature reflecting dependency relationship of the first group with one or more groups from the one or more groups, the first group comprising a first code file, wherein the determining of the first dependency signature comprises:
      identifying dependency relationships of items that are members of the first group,
      determining those relationships from the identified dependency relationships that cross group boundary of the first group, and
      including the determined relationships that cross group boundary of the first group into the first dependency signature;
   determining one or more affected groups from the one or more groups, based on the first dependency signature, the one or more affected groups being affected by the change associated with the first group, an item from the one or more affected groups being a second code file; and
   inspecting one or more items only within the one or more affected groups to determine whether such items require updating to achieve consistency with the identified change.

13. The computer program product of claim 12, the computer program product further comprising computer instructions for calculating a group dependency graph, the group dependency graph reflecting dependency relationships among groups in the one or more group of items.

14. The computer program product of claim 13, the computer program product further comprising computer instructions for producing a dependency report based on the group dependency graph.

15. The method of claim 1, wherein the determining of the first dependency signature comprises calculating the first dependency signature.

16. The method of claim 1, wherein the determining of the first dependency signature comprises accessing the first dependency signature, the first dependency signature having been previously calculated and stored.

17. The method of claim 1, wherein the first dependency signature comprises a context-specific dependency information.

18. The method of claim 1, comprising calculating respective dependency signatures for each group in the one or more groups.

19. The method of claim 1, updating the first dependency signature.

20. The method of claim 1, updating dependency signatures for each of the affected groups.

21. The method of claim 2, updating the group dependency graph, based on data associated with the affected updated groups.

22. The method of claim 1, wherein the partitioning of the set of items into the one or more groups of items comprises utilizing determined interdependencies among items in the set of items.

23. The method of claim 1, wherein the determining of the first dependency signature comprises determining dependency relationships that cross group boundary of the first group, utilizing "#include" and/or "import" statements in any of the items from the first group.

* * * * *